United States Patent

[11] 3,629,570

[72] Inventors Pierre Bouthors;
 Francois Archaux, both of Billancourt, France
[21] Appl. No. 835,348
[22] Filed June 23, 1969
[45] Patented Dec. 21, 1971
[73] Assignees Regie Nationale Des Usines Renault
 Billancourt, France;
 Automobiles Peugeot
 Paris, France
[32] Priority Aug. 1, 1968
[33] France
[31] 161498

[54] AUTOMATIC CORRECTOR FOR AUTOMOTIVE HEADLAMP BEAM ORIENTATION
6 Claims, 4 Drawing Figs.
[52] U.S. Cl. ................................................... 240/7.1, 240/41.61
[51] Int. Cl. ...................................................... B60q 1/00

[50] Field of Search ............................................. 240/7.1 LC, 7.1, 41.61, 8.12, 8.26, 44.1, 62.4

[56] References Cited
UNITED STATES PATENTS
1,575,403  3/1926  Yeager .......................... 240/41.61
1,585,751  5/1926  Yeager .......................... 240/41.61
1,616,042  2/1927  Halvorson, Jr. ............... 240/44.1 X Primary Examiner—Louis J. Capozi
Attorney—Stevens, Davis, Miller & Mosher ABSTRACT: Automatic device for varying the orientation of the light beam emitted by the headlamps of an automobile vehicle, said headlamps comprising each a light source and a reflector, wherein the light from said source is reflected by at least one pivotally mounted mirror of which the movements are controlled by means of a system responsive to the vehicle orientation.

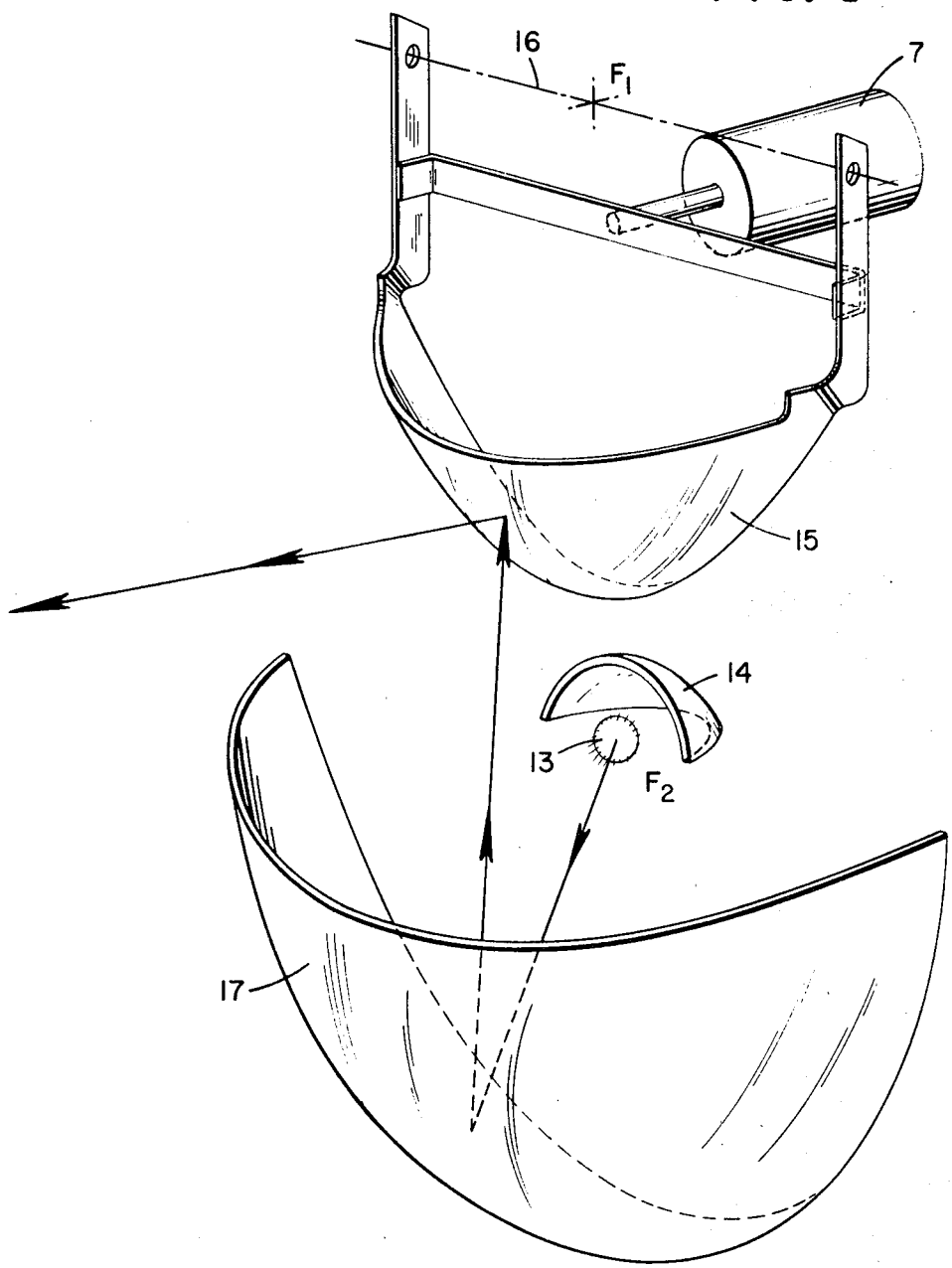

AUTOMATIC CORRECTOR FOR AUTOMOTIVE HEADLAMP BEAM ORIENTATION

The present invention relates in general to headlamps of automobile vehicles and has specific reference to an automatic device for correcting the orientation of the light beams emitted by the headlamps of an automobile vehicle, which headlamps comprise as a rule a light source and a reflector.

This device is designed inter alia for varying this orientation as a function of the load carried by the vehicle.

It is known that the light beams emitted by the headlamps whether of conventional design, or not, equipping an automobile vehicle undergo angular variations as a function of the load supported by this vehicle. The headlamps may thus be caused to direct the beams either too high and thus dazzle oncoming drivers, too low so that the area illuminated thereby is abnormally reduced.

The trim which, in former vehicle types, did not vary appreciably due to the relative stiffness of the suspension and to the distribution of the mechanical masses among the front and rear axles, is particularly variable in modern vehicles having a highly flexible suspension system and compact power-transmission units. It is therefore necessary nowadays to correct the headlamp orientation as a function of the variations occurring in the vehicle trim.

Now hitherto known headlamp arrangements comprise a lamp enclosing one or more filaments in its bulb, a reflector, mostly of parabolic configuration, and a front glass acting as an optical corrector. In certain cases a sealed beam lamp is used which comprises a perfectly sealed reflector and optical glass assembly containing the filaments enclosed in the glass envelopes of the bulb proper.

A great number of devices have already been proposed for acting upon these known systems, by modifying the angular position either of the complete headlamp, or of the bulb which is moved in relation to its reflector, or of the reflector itself, in order to produce variations on the direction of the light beams as a function of the variations in the vehicle trim.

According to this invention the automatic device for varying the orientation of the light beams emitted by the headlamps of an automobile vehicle, which headlamps comprise each a light source and a reflector, is characterized in that the light emitted by said source is reflected by at least one pivotally mounted mirror of which the movements are controlled by a system responsive to the vehicle orientation.

In a specific application of this system, the latter is responsive to the longitudinal trim of the vehicle and the mirror is adapted to pivot about a substantially horizontal axis extending at right angles to the direction of travel of the vehicle. Preferably, the control system acts upon a mirror having a particularly low inertia in order to obtain the maximum sensitiveness, said mirror being operatively connected to the load-correction servo-mechanism and reflecting the light beam from the light source according to the actual position of the vehicle trim with a timelag reduced to the minimum value.

Other features and advantages of this invention will appear as the following description proceeds with reference to the attached drawing showing by way of illustration a preferred form of embodiment of the invention. In the drawing:

FIG. 4 is an enlarged perspective view showing only those portions of the headlamp necessary for the invention.

Figure 1:
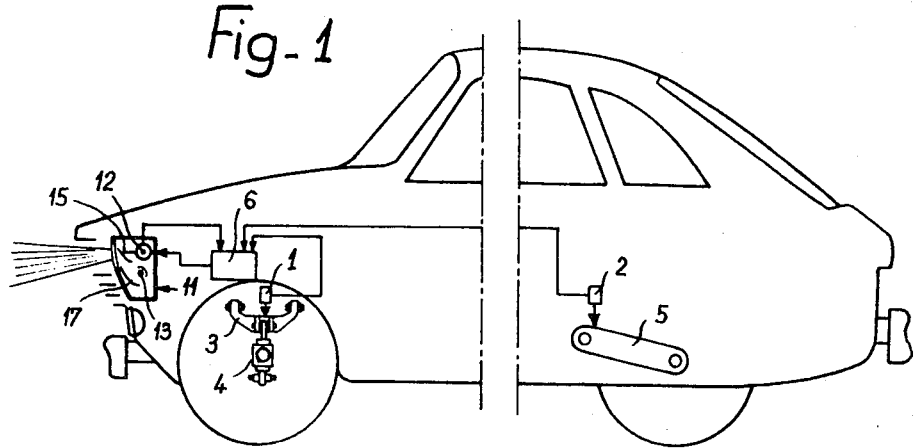
FIG. 1 shows diagrammatically an automobile vehicle equipped with the device of this invention.
Figure 2:
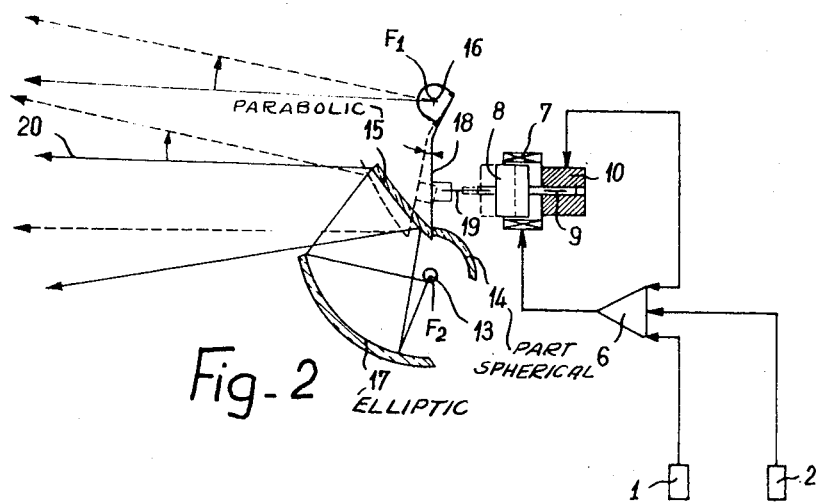
FIG. 2 is a basic diagram showing a preferred form of embodiment of the invention.

As shown in FIGS. 1 and 2, the transducers 1 and 2 for detecting the variations in the vehicle trim are so mounted on the suspended portion of the vehicle that they are responsive to beats or changes of position of front and rear suspension elements. Thus, the transducer 1 is responsive to the movements of the upper front suspension wishbone 3 supporting the kingpin and stub-shaft unit 4; the lower suspension wishbone or arm is not shown. The other transducer 2 is actuated by the rear suspension arm 5.

Both transducers 1 and 2 transmit data to a differential amplifier 6 connected to coil surrounding a magnetized plunger core 8 of the repulsion type, i.e. a ferrite core 8 urged outwards by the energizing current flowing through the coil 7. A plunger core 9 embedded by moulding in and coaxial to the ferrite core 8 is movable in a transducer 10 adapted to deliver back to the differential amplifier 6, in the form of electrical data, the signals produced by the movements of said ferrite core.

Each headlamp 11 comprises on the one hand an assembly comprising the elements 7 to 10 described hereinabove and shown in the diagrammatic or synoptic form of a circle 12 in FIG. 1, and on the other hand a light source 13 associated with a part-spherical mirror 14, a parabolic divergent mirror 15 pivotally mounted on a substantially horizontal axis 16 extending at right angles to the direction of motion of the vehicle, and finally a fixed elliptic mirror 17.

The mirror 15 having the minimum surface area and inertia is pivotally mounted about the axis 16 by means of a support 18 connected in turn by a link 19 substantially coaxial with and pivoted to the core 8.

The pivot axis 16 is coincident with the focus of the pivoting parabolic mirror 15 and with the first focus $F_1$ of the elliptic mirror 17.

The other focus $F_2$ of elliptic mirror 17 lies in the center of the part-spherical mirror 14 and the external middle of the filament of lamp 13. This lamp 13 is advantageously a halogen lamp in order more efficiently to compensate losses, notably by reflection, on the different mirrors.

The light emitted from $F_2$ of lamp 13 is directed in the form of convergent rays by the elliptic mirror 17 towards the focus $F_1$ and then reflected in the form of divergent rays by the parabolic mirror 15 in the direction of the generatrix of the relevant parabola.

The light rays emitted from the different points of the filament other than $F_2$ are directed towards the steric zone extending between foci $F_1$ and $F_2$ (this zone being adjacent to $F_1$). The rays are reflected by the parabolic mirror 15 on a same side of the main ray 20; thus, a clean cut is produced in the beam.

Finally, independently, of the automatic operation, switching from road lighting to dipped or crossing lighting may advantageously be obtained by controlling the position of parabolic mirror 15.

The use of an elliptic mirror 17 is advantageous in that it will concentrate the beam very strongly so that an output parabolic mirror of very small surface area and therefore of very low inertia can be used, thus increasing considerably the reliability and efficiency of the automatic control device.

In order to improve the lateral road illumination the filament of lamp 13 is disposed at right angles to the major axis of the ellipse $F_1$, $F_2$. The transverse illumination is due mainly to the position of the above-described filament.

Figure 3:
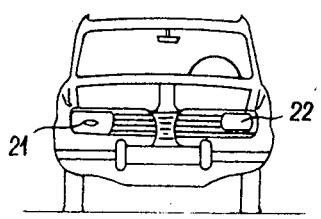
FIG. 3 illustrates in front elevational view a vehicle for setting in sharp contrast the difference between the cross-sectional areas of the light beam outlets in the case of a device according to the invention and in the case of a conventional headlamp.

As evidenced by the comparative FIG. 3, the cross-sectional area of the road-illuminating beam 21 obtained with the device of this invention is particularly small and may be of the order of 18 square centimeters. This feature may be used to advantage in designing the bodies of automotive vehicles and thus bring a complete change in the styling thereof. In fact, the area 21 is about 10 times smaller that the surface area 22 of a conventional headlamp.

It will be noted that the differential amplifier 6 is a device sufficiently known to regulation specialists to make it unnecessary to describe this device in detail. This amplifier is shown only in diagrammatic form in FIGS. 1 and 2 from which the source of current necessary for energizing the device has also been omitted, this source consisting of a storage battery, a generator or an alternator.

Of course, this invention is not limited by the specific form of embodiment described and illustrated herein but includes all modifications and variations within the skill of those conversant with the art, this remark applying both to the manufacture and to the possible applications of the invention. Thus, the principle on which this invention is based may also advantageously be used for replacing or constituting an auxiliary cornering or spotlight projector, that is, for producing a controlled or automatic horizontal deflection of the light beam. In this case it would only be necessary to provide means for pivoting the mirror 15 about a substantially vertical axis.

We claim:

1. In a headlamp for an automotive vehicle, a device for automatically varying the orientation of the light beam emitted from a light source in said headlamp in accordance with the longitudinal trim of the vehicle, said device comprising a reflector system defining a path for said light beam and comprising at least one parabolic mirror, at least one part-spherical mirror, and at least one elliptic mirror, means pivotally mounting said parabolic mirror for movement about a substantially horizontal axis extending transversely of said vehicle, said axis being coincident with the focus of said parabolic mirror, means fixedly mounting said elliptic mirror with one of its two foci coincident with the focus of said parabolic mirror and with its other focus coincident with the center of said part-spherical mirror and said light source, and control means responsive to the longitudinal trim of the vehicle operatively connected to pivotally move said parabolic mirror wherein the light from said source is reflected by said reflector system in a direction determined by the longitudinal trim of said vehicle.

2. An automatic device according to claim 1, wherein said light source is a filament lamp, the external middle of said filament lying at the axial center of said part-spherical mirror.

3. An automatic device according to claim 2, wherein the filament of said lamp extends at right angles to the major axis of said elliptic mirror.

4. An automatic device according to claim 1, further comprising means connected to said parabolic mirror to move said mirror between full-beam open-road lighting and dipped lighting.

5. An automatic device according to claim 1, wherein said control means comprises means to sense vertical movement of the front and rear wheels of the vehicle with respect to the suspended portion thereof and means to pivot said parabolical mirror in response to the sensed movement.

6. An automatic device as set forth in claim 1, wherein the cross-sectional outlet area of the light beam produced by the device is about one-tenth that of a conventional headlamp consisting of a light source and a fixed parabolic reflector.

* * * * *